(12) United States Patent
Soliman

(10) Patent No.: US 7,839,882 B2
(45) Date of Patent: Nov. 23, 2010

(54) RESOURCE ALLOCATION IN A WIRELESS COMMUNICATION SYSTEM

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1217 days.

(21) Appl. No.: 10/285,901

(22) Filed: Oct. 31, 2002

(65) Prior Publication Data

US 2004/0085909 A1 May 6, 2004

(51) Int. Cl.
*H04W 72/12* (2009.01)
(52) U.S. Cl. .................... 370/437; 455/453
(58) Field of Classification Search .......... 370/328, 370/329, 338, 339, 437; 455/450–453, 455
See application file for complete search history.

(56) References Cited

U.S. PATENT DOCUMENTS

| | | | | |
|---|---|---|---|---|
| 5,915,214 | A * | 6/1999 | Reece et al. | 455/406 |
| 6,125,278 | A * | 9/2000 | Wieczorek et al. | 455/437 |
| 6,163,700 | A * | 12/2000 | Hussain et al. | 455/453 |
| 6,233,449 | B1 | 5/2001 | Glitho et al. | |
| 6,246,880 | B1 | 6/2001 | Iizuka | |
| 6,256,490 | B1 * | 7/2001 | Yost et al. | 455/405 |
| 6,385,179 | B1 * | 5/2002 | Malcolm et al. | 370/329 |
| 6,553,232 | B1 * | 4/2003 | Shaffer et al. | 455/440 |
| 6,721,554 | B2 * | 4/2004 | Gnesda et al. | 455/406 |
| 6,782,253 | B1 * | 8/2004 | Shteyn et al. | 455/414.1 |
| 6,807,426 | B2 | 10/2004 | Pankaj | |
| 6,973,098 | B1 * | 12/2005 | Lundby et al. | 370/491 |
| 2003/0078050 | A1 * | 4/2003 | Carlborg et al. | 455/452 |
| 2006/0008063 | A1 * | 1/2006 | Harnesk et al. | 379/114.01 |

FOREIGN PATENT DOCUMENTS

| | | |
|---|---|---|
| GB | 2 316 275 | 2/1998 |
| WO | 02/41528 | 5/2002 |

OTHER PUBLICATIONS

International Search Report—PCT/US03/034518, International Searching Authority—European Patent Office, Jun. 21, 2004.
Written Opinion—PCT/US03/034518—IPEA/US, Alexandria, VA May 30, 2008.

* cited by examiner

*Primary Examiner*—Pankaj Kumar
*Assistant Examiner*—Duc T Duong
(74) *Attorney, Agent, or Firm*—Eric Ho

(57) ABSTRACT

Method and apparatus for scheduling transmissions in a wireless communication system using historical information and usage patterns of remote users in the system. Usage patterns for users within a system are stored and analyzed to optimize transmissions and resources in the system. In one embodiment, the user patterns are used to predict travel routes and transmissions scheduled accordingly. In another embodiment, the system is an ad-hoc system or a hybrid system, wherein the usage patterns are used to determine the source-to-destination paths.

23 Claims, 11 Drawing Sheets

| | START LOCATION | END LOCATION | SYSTEM LOADING | CALL HISTORY | DATA RATE | CHANNEL QUALITY | TYPE SERVICE |
|---|---|---|---|---|---|---|---|
| USER 1 | A | B | HIGH | T=5-10 | HIGH | GOOD | DATA |
| USER 1 | A | B | HIGH | T=15-20 | HIGH | FAIR | VOICE |
| USER 2 | C | F | MEDIUM | T=1-3 | LOW | POOR | DATA |
| USER 2 | C | F | LOW | T=7-20 | HIGH | POOR | DATA |
| USER 3 | D | E | HIGH | T=7-10 | HIGH | FAIR | BC |

FIG. 3

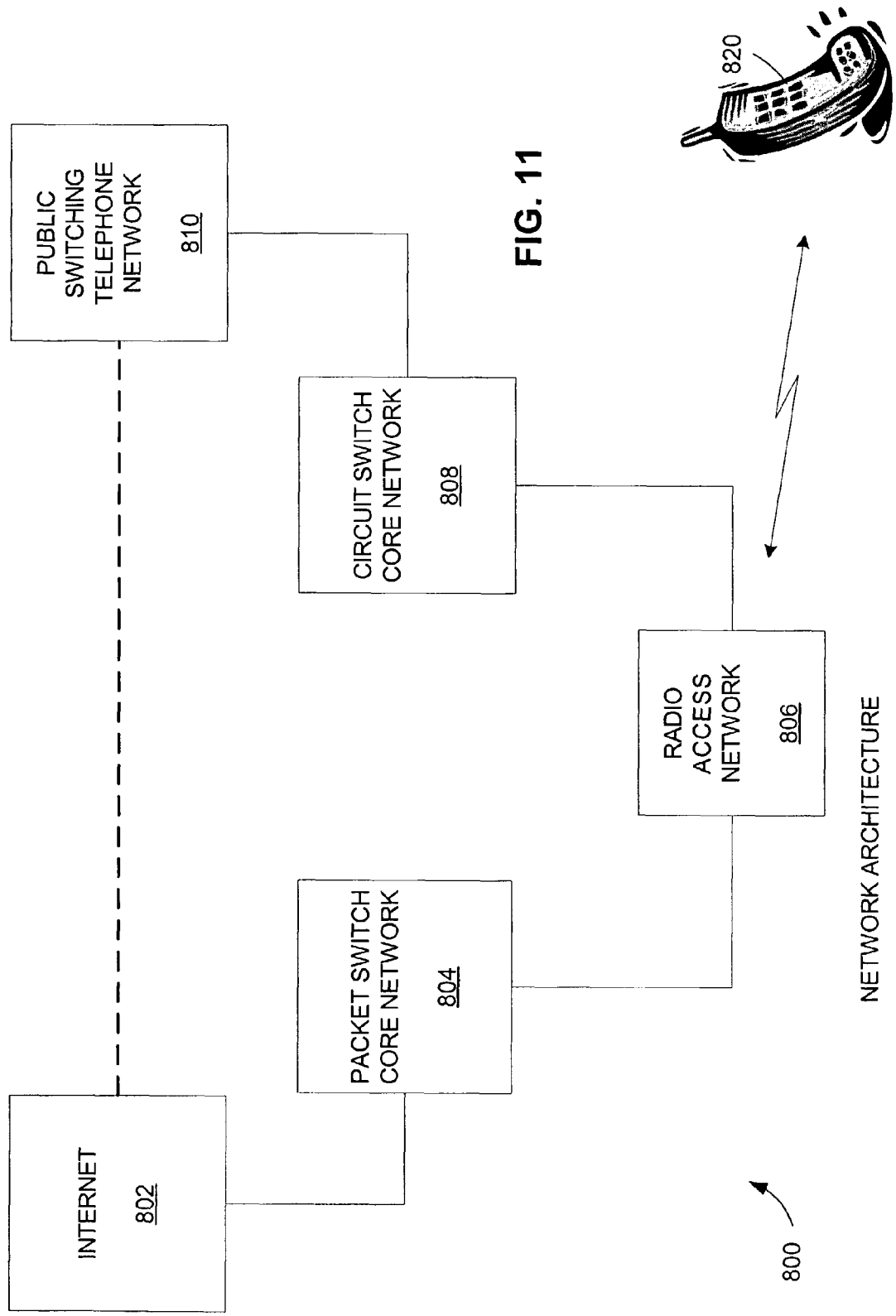

RESOURCE ALLOCATION IN A WIRELESS COMMUNICATION SYSTEM

BACKGROUND

1. Field

The present invention relates to resource allocation in a wireless communication system, and more specifically to scheduling of transmissions to multiple users as a function of user historical information.

2. Background

Emerging high-speed data networks attempt to balance efficient resource allocation with the provision of fair service to a variety of users. Many variables complicate this balancing effort. For example, in many communication systems, users are provided a variety of service options. Those users that subscribe to higher premiums for faster connections expect to have priority over users that subscribe to lower premiums. Similarly, data rate requirements of the various services provided require the system to adapt to the actual usage as well as potential usage of the system at any given time. Further, packet transmissions are constrained to specified packet delay requirements in particular to real-time data users, such as in a broadcast transmission. Still further, optimization of the quality of service to each user is fundamental to maintaining users in a communication system. Quality of Service, or QoS, of a wireless channel is typically different for different users, and randomly changes with time.

As the use of portable computers, smart wireless phones, and personal digital assistants increase, the multimedia services demand will likely overwhelm the resources of current wireless networks. It is important to exploit all available information when considering ways to deliver the quality of service that end users expect. If the system knows that for the next few seconds the channel conditions is not favorable to send a specific data rate or there will be too many handoffs that consumes additional resources and hence does not transmit to the wireless device until conditions have improved. Here lies the tradeoff in which the scheduler must decide whether it is efficient to transmit to a particular wireless device even when that decision may decrease the instantaneous channel throughput. Efficient data scheduling techniques are designed to meet the various needs of resource allocation and fairness and minimize interference to other users. There are a variety of scheduling techniques and algorithms available to meet such needs. Most of these algorithms consider the currently pending data rate requests and the current channel conditions of the system. Developing a scheduling technique that responds to the condition of the current system incurs a delay, as the system controller must receive such information prior to making scheduling decisions. As the number of users desiring data services increases, such delays may negatively impact the quality of service of said system. In addition, knowing the usage patterns of wireless users one can design more efficient assignment strategies. For example, knowing the average hold time of data call for a user at specific times of the day can be used to influence the assignment strategy of the data bursts.

There is, therefore, a need in the art to allocate resources in a communication system and avoid part or all of the delay incurred by responding to the current state of a communication system and meantime minimize interference to other users. Still further, there is a need to use historical information to predict trends of usage and act a priori to the system state. Additionally, there is a need to predict a future condition of the system including the state of the communication channel(s), and available resources for application in scheduling algorithms. Furthermore, there is a need to utilize knowledge about usage patterns to develop efficient assignment strategies.

BRIEF DESCRIPTION OF THE DRAWINGS

FIG. 3 is table illustrating subscriber usage in a communication system as in FIG. 2.

FIG. 11 illustrates data processing paths in a communication network.

DETAILED DESCRIPTION

Figure 1:
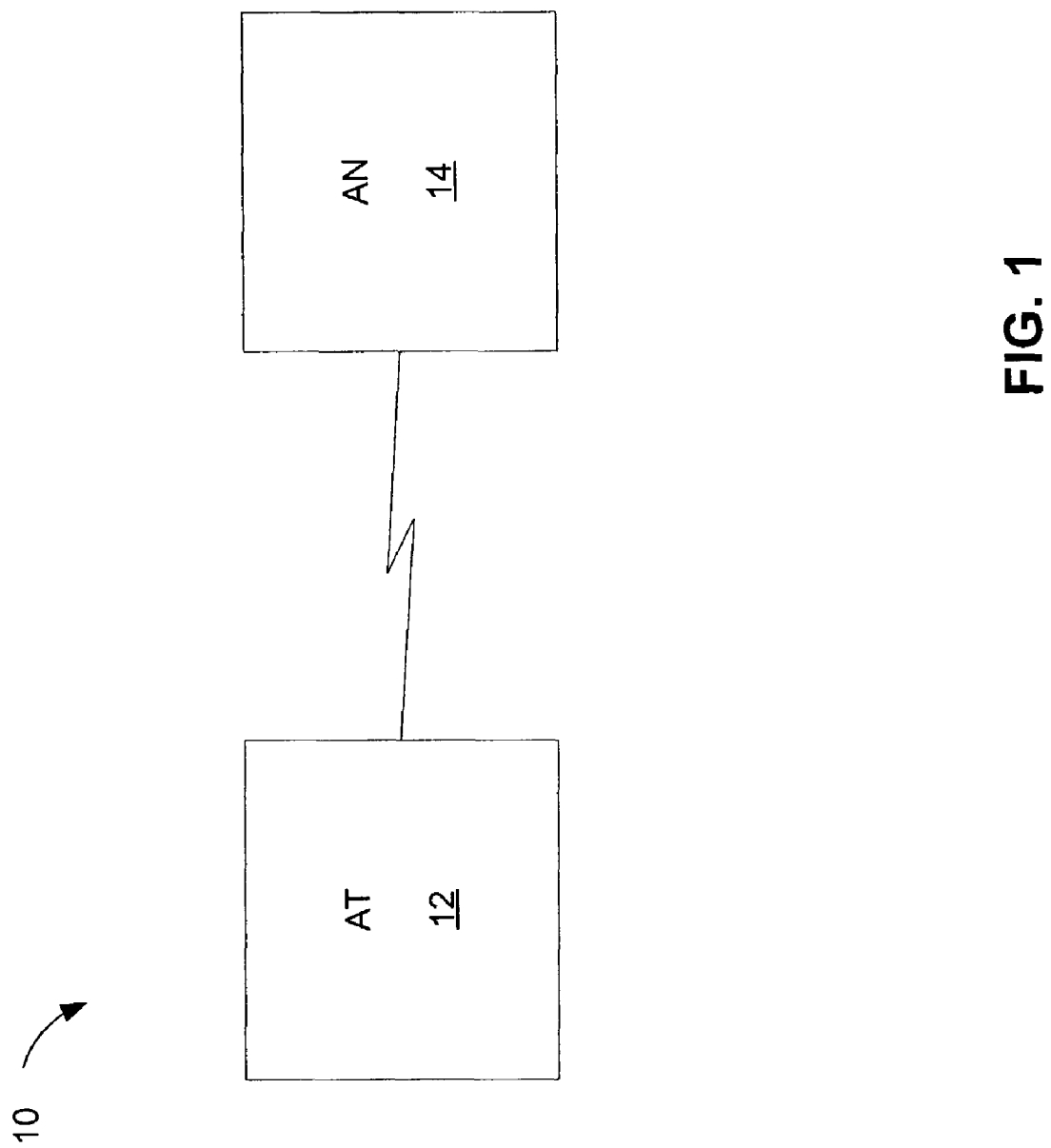
FIG. 1 is an illustration of a communication network supporting high data rate communications.

Cellular radio provides mobile telephone service by employing a network of cell sites distributed over a wide area. A cell site contains a radio transceiver and a base station controller which manages, sends, and receives traffic from the mobiles in its geographical area to a cellular telephone switch. It also employs a tower and its antennas, and provides a link to the distant cellular switch called a Mobile Telecommunications Switching Office (MTSO). This MTSO places calls from land based telephones to wireless customers, switches calls between cells as mobiles travel across cell boundaries, and authenticates wireless customers before they make calls.

The processing routes for data with a communication system 800 are illustrated in FIG. 11. A subscriber unit 820 is in wireless communication with Radio Access Network (RAN) 806. The RAN 806 may process information packet switch core network 804 or the circuit switch core network 808. The packet switch core network 804 supports packetized data communications, such as communications with the Internet 802. The circuit switch core network 808 supports voice and data communications via a public switching telephone network 810.

Complex signaling routines handle call placements, call requests, handovers, or call transfers from one cell to another, and roaming, moving from one carrier's area to another. Different cellular radio systems use Frequency Division Multiple Access (referred to a FDMA and is typically analog), Time Division Multiple Access (TDMA), and spread spectrum such as Code Division Multiple Access (CDMA) techniques.

Throughout the following discussion a CDMA communication system is considered; however, the invention is applicable to any multiple access technology that provides wireless service that is delay insensitive. A CDMA system may be designed to support one or more standards, such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by the consortium named "3$^{rd}$ Generation Partnership Project" referred to herein as 3GPP, and embodied in a set of documents including Document Nos. 3G TS 25.211, 3G TS 25.212, 3G TS 25.213, 3G TS 25.214, and 3G TS 25.302 referred to herein as the W-CDMA standard; and (3) the standard offered by a consortium named "3$^{rd}$ Generation Partnership Project 2" referred to herein as 3GPP2 and Document No. TR-45.5 referred to herein as the cdma2000 standard (formerly called IS-2000 MC). These are provided as examples of spread spectrum systems.

Systems, such as those given hereinabove, as well as other systems, may also provide High Data Rate (HDR) service. An example is a system that supports the standard "TIA/EIA/IS-856 cdma2000 High Rate Packet Data Air Interface Specification" referred to herein as the HDR standard and "TIA/EIA/IS-856-1 cdma2000 High Rate Packet Data Air Interface Specification Addendum" referred to herein as the HDR addendum. An HDR subscriber station, referred to herein as an Access Terminal (AT), may be mobile or stationary, and may communicate with one or more HDR base stations, referred to herein as Modem Pool Transceivers (MPTs).

FIG. 1 illustrates an architectural reference model 10 of a communication system supporting HDR. An AT 12 communicates with an AN 14 via an air interface. The AT 12 is a device providing data connectivity to a user. The AT 12 may be connected to a computing device such as laptop personal computer or it may be a self-contained device such as a Personal Digital Assistant (PDA). An AT 12 is similar to a Mobile Station (MS). An AN 14 is the network equipment providing data connectivity between a packet-switched data network (typically the Internet) and the ATs, such as AT 12. An AN 14 is similar to a Base Station (BS).

An access terminal transmits and receives data packets through one or more modem pool transceivers to an HDR base station controller, referred to herein as a Modem Pool Controller (MPC). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link. The term data may generally refer to packet data.

The systems described hereinabove are given as examples and the present invention is also applicable to any communication system that allocates resources to multiple users. The embodiments presented herein are applicable to any of multiple communication systems that schedule transmissions to multiple users.

Many system models and algorithms seek to solve resource allocation and resource management problems in communication systems. For example, one algorithm, referred to as the Proportional Fair algorithm, uses the requested data rates specified in a Data Rate Control (DRC) message to maximize the sum data rate of the transmissions to all users while ensuring that the ratio of the transmission rates to any two users satisfies a predetermined Grade of Service (GoS). Other methods and algorithms are described in "Method and Apparatus for Scheduling Transmissions in a Communication System" having U.S. patent application Ser. No. 09/974,933, by Rajesh Pankaj, filed on Apr. 12, 2001, and assigned to the assignee hereof, which is hereby expressly incorporated by reference. Many of these algorithms require state of the system information, such as requested data rate, and/or channel condition information, such as Carrier to Interference ratio (C/I). The embodiments presented herein seek to avoid the need for such information in projecting a scheduling plan.

To avoid the problems of traditional scheduling systems, and provide a more efficient and accurate method for allocating resources, a system and method for location-based assignment strategy and scheduling algorithms to be used for data applications is presented. The system employs a database that is indexed by location of the wireless device. Such a database may be used for scheduling transmissions, determining and controlling handoff, control decisions for power control, channel assignment strategies, as well as for many other purposes. The database is always kept up to date by continuously collecting measurements from all active terminals. The application of historical user information may serve as an enhancement to existing methods for these applications, such as scheduling. The added information may serve to fine-tune the control procedures and decisions, as well as to optimize algorithms and techniques.

Many data applications rely on the ability of the network to provide Quality-of-Service (QoS) guarantees. These guarantees are usually in the form of bounds on end-to-end delay, bandwidth, variation in delay (delay jitter), packet loss rate, connection loss or a combination of these parameters. Providing QoS guarantees in a packet network requires a sound channel assignment strategy and the use of traffic scheduling algorithm in the routers (base station controllers or switches). The function of the channel assignment block is to execute the channel assignment strategy. Different strategies may be used such as infinite duration, pseudo-infinite duration and fixed duration assignments. The function of the scheduling algorithm is to select, for each outgoing channel of the router, the packet to be transmitted in the next cycle from the available packets belonging to the flows sharing the channel.

A database containing the features of the received signal can be used to determine the location of wireless devices. These databases are then indexed according to some features of the signals, such as signal strength received by the wireless device or the base station, number of pilots seen by the wireless device, strength of each pilot, multipath characteristics, etc.

The inverse process is useful too, wherein a similar database is indexed by the location of the wireless device and may be used to learn about the features of the received signal. Furthermore, these databases may be used to predict the future of the received signal features (e.g., predict the behavior of the channel). Both short and long-term prediction is possible if the trajectory of the movement of the device is known.

Scheduling

Figure 2:
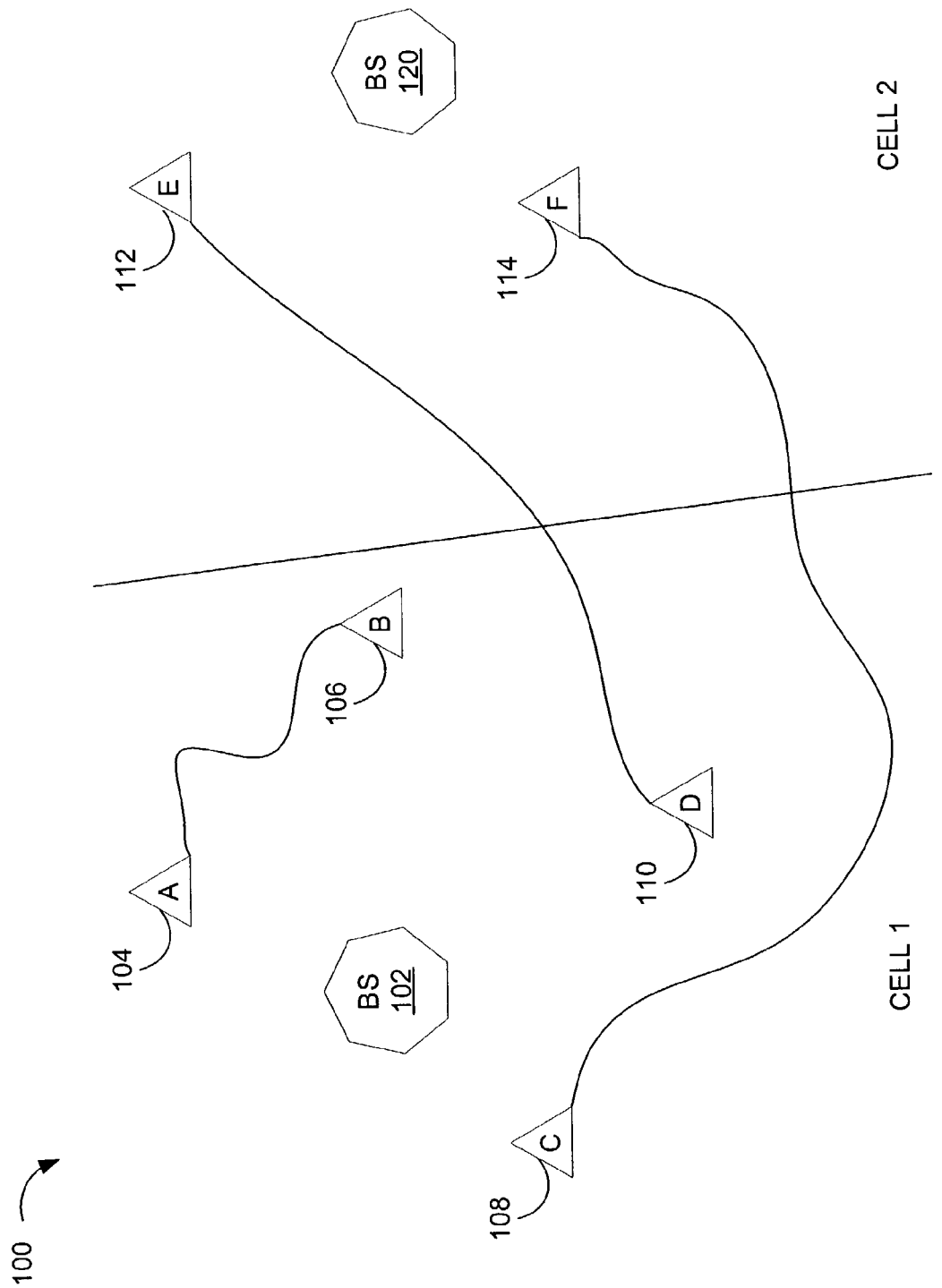
FIG. 2 is an illustration of a communication system topography, wherein multiple user usage history is superimposed over the topography.

In one embodiment, the channel assignment strategy and optimum scheduling algorithms for data applications in third generation wireless systems (3G) are optimized by use of such a database. As an example, FIG. 2 illustrates topography of a wireless communication system, such as a system supporting data transmissions. The system 100 includes multiple base stations or ANs, of which two are illustrated, BS 102, 120. Each of BS 102, 120 has an associated range of service labeled cell 1, cell 2, respectively. The trajectory of daily usage for three users is superimposed over the layout. A first user, USER 1, moves from point A 104 to point B 106 at a specified time each workday. While there is some range of times each day, as well as some variation on the path taken, on average USER 1 moves from point A 104 to point B 106 at approximately the same time each day. Note that USER 1 may have other patterns of use which are not illustrated in FIG. 2. The illustrated trajectory for USER 1 remains fully within cell 1. A second user, USER 2, moves from point C 108 to point F 114 each workday. In this case, point C 108 is within cell 1, and point F 114 is within cell 2. A third user, USER 3 moves from point D 110 to point E 112. Again, the trajectory for USER 3 starts in cell 1 and travels to cell 2.

The user trajectories and data compiled are developed by monitoring each user's access to the communication system. The trajectories are determined specifically based on known geographical information, such as maps which may be stored in a Geographical Information System (GIS). The process first determines the location of a user at the start of a communication. This may be done by the user of Global Positioning System(s) (GPS) which identify each user's location by longitude, latitude, and height. This assumes the user is traveling in an automobile or other vehicle. GPS is a satellite navigation system. GPS provides specially coded satellite signals that can be processed in a GPS receiver, enabling the receiver to compute position, velocity and time. The location of the user is then monitored throughout the communication and matched to roads and streets known in the area. In this way, a projected trajectory is compiled. Using the GPS and GIS information, it is possible to predict the movement of a given user during a communication. Adding to this information, traffic patterns, delays, accidents, outages, etc., a better estimation of the trajectory and travel time is made.

Knowledge of the current and previous positions of the wireless device may be used to predict the trajectory of the motion of the device. The trajectory is identified according to known geographical features, such as mountains, buildings, and other considerations that affect the channel quality. The trajectory may be used along with other information stored in the database to predict the received signal features at the wireless device. In a CDMA network, for example, database information may include but not be limited to, pilot signal strength, rate of change of pilot strengths, number of pilots, soft and hard handoff regions, etc. The predicted signal features may then be used intelligently for both channel assignment strategy and scheduling algorithms for data applications.

For example, if it is projected that the wireless device will travel through an area that is know to have many successful handoffs in a very short period of time, the scheduler could delay assigning time slots until the wireless device passes through the area or assign data at a lower rate with shorter bursts. On the other hand if it is projected that the wireless device will travel through an area with stale channel conditions, the scheduler may assign maximum data rates with longer bursts.

Similarly, if the wireless device is about to move into an area where it is known from the signal features database that the received signal strength gets weak for a short period of time (short term coverage hole), the system may not assign a channel for this period of time. Or it may assign a channel at a lower rate until the wireless device passes this specific area. Both the scheduler and channel assignment algorithms may take advantage of the a priori knowledge of the channel conditions. Issues such as the size of the area with weak signal strength and the depth of fades should be taken into consideration for assigning the channel and scheduling the time slot to deliver the data to the wireless device. Note that there may be more than one database; one for different seasons of the year, one for different times of the day (rush-hour vs. normal hours), one for different system loading conditions, etc.

The database categories of one embodiment are illustrated in FIG. 3, having a variety of fields. Information is stored for each user, and a separate entry is made for multiple accesses to the communication system. Alternate embodiments may employ a variety of methods for storing information as well as selecting different field categories. The start location and end location of the trajectory are identified. Note that these may include subfields to monitor the travel of each user, or may include subfields that mark the start and end of each communication access. Similarly, an individual access may be broken into portions, such as for a long transmission along a trajectory experiencing changing channel conditions. As illustrated, USER 1 accesses the communication system two times on the commute from home, point A 104, to work, point B 108. The users may access a variety of services. Fields are provided to indicate the system loading during each access. The call history indicates the time of each access and may be stored using a military clock over a day, week, month, etc. Additionally, the data rate, channel quality, and service type information is stored for each access. The channel quality is available as feedback from the user. Furthermore, the usage pattern of the subscriber can be utilized to manage system resources on a sector basis. For example, to reserve more resources for voice usage in areas and time of day where voice is the most requested service and to reserve more resources for data usage in areas and at times when data is at higher demand. Alternate embodiments may store the information in a variety of ways. In the present embodiment, the information may be accessed by any of the fields. For example, the system may use the call history information to match to a current time of day and make control decisions accordingly.

Figure 4:
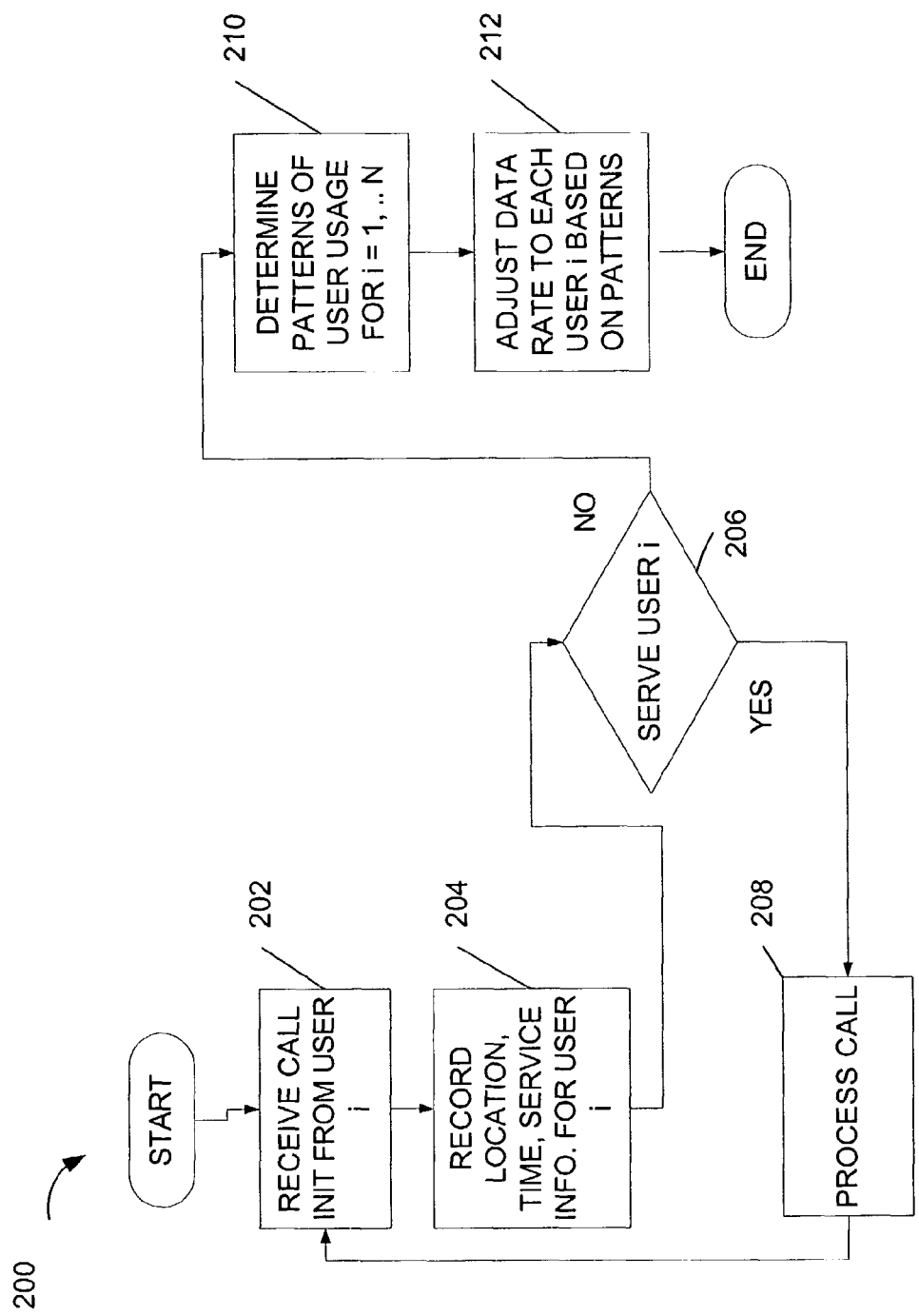
FIG. 4 is a method for scheduling data transmissions in a communication system.

FIG. 4 illustrates a flow diagram of a method of using and updating the database. The process starts on initiation of a communication by a user at step 202. At step 204 the base station or AN records the location of the user, as well as the time and service desired. At decision diamond 206, the decision is made to serve the user. Such decision may be implemented by any of a variety of scheduling algorithms. If the user is served, the process continues to step 208 to process the communication. Else, processing continues to step 210 to determine patterns of user usage for the various users of the system. As illustrated a total of N users is considered. The data rate to each user is then adjusted according to the determined patterns at step 212. When the pattern of usage changes, the base station may determine to update the database. Note that the process 200 of FIG. 4 may be performed by the base station or a Base Station Controller (BSC) or at a higher level of control.

Figure 5:
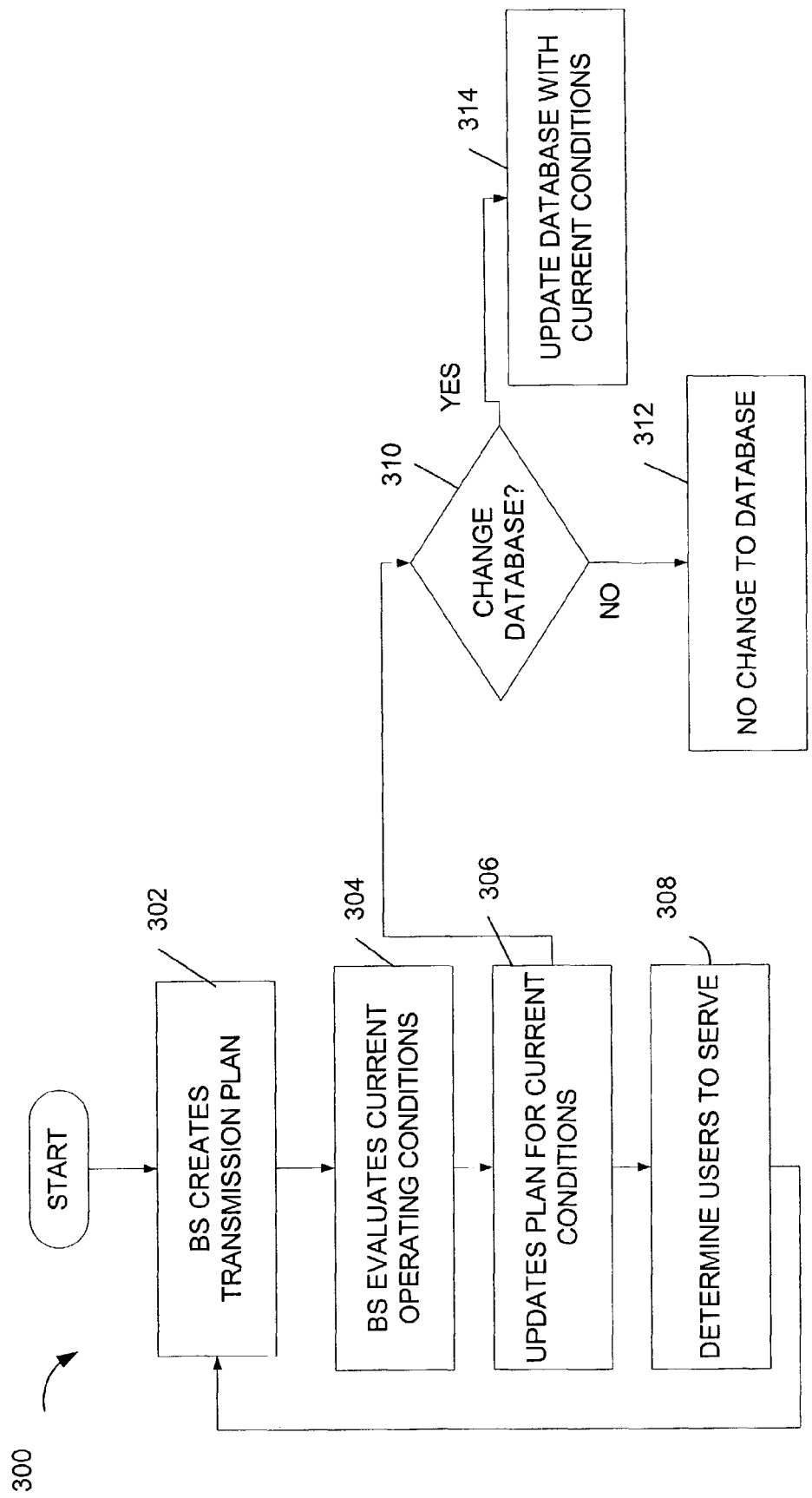
FIG. 5 is a method for maintaining a database of user profile information in a communication system.

In one embodiment, the base station creates a transmission-scheduling plan and then adjusts according to actual usage as well as in response to updates in the database. FIG. 5 illustrates a process 300 performed by the BS, or at a higher level of control, wherein the BS creates a plan at step 302 and evaluates operation of the system at step 304. The BS updates the plan, or makes a temporary change to the database that considers the current operating conditions at step 306. The BS then determines the users to serve at step 308. In response to step 306, the BS determines if a change is to be made to the stored database at decision diamond 310. In other words, the BS determines if the current operating conditions include an anomaly or are a trend that is to be reflected in the stored features. Subject to the decision either no change is made to the database at step 312 or the database is updated at step 314.

In an alternate embodiment, the historical information of user usage is available for prediction of future usage, such as driving routes and patterns. Such predictions aid in scheduling users in a system. By coupling such information to a Geographical Information System (GIS) type database for traffic, traffic conditions may be.

Figure 6:
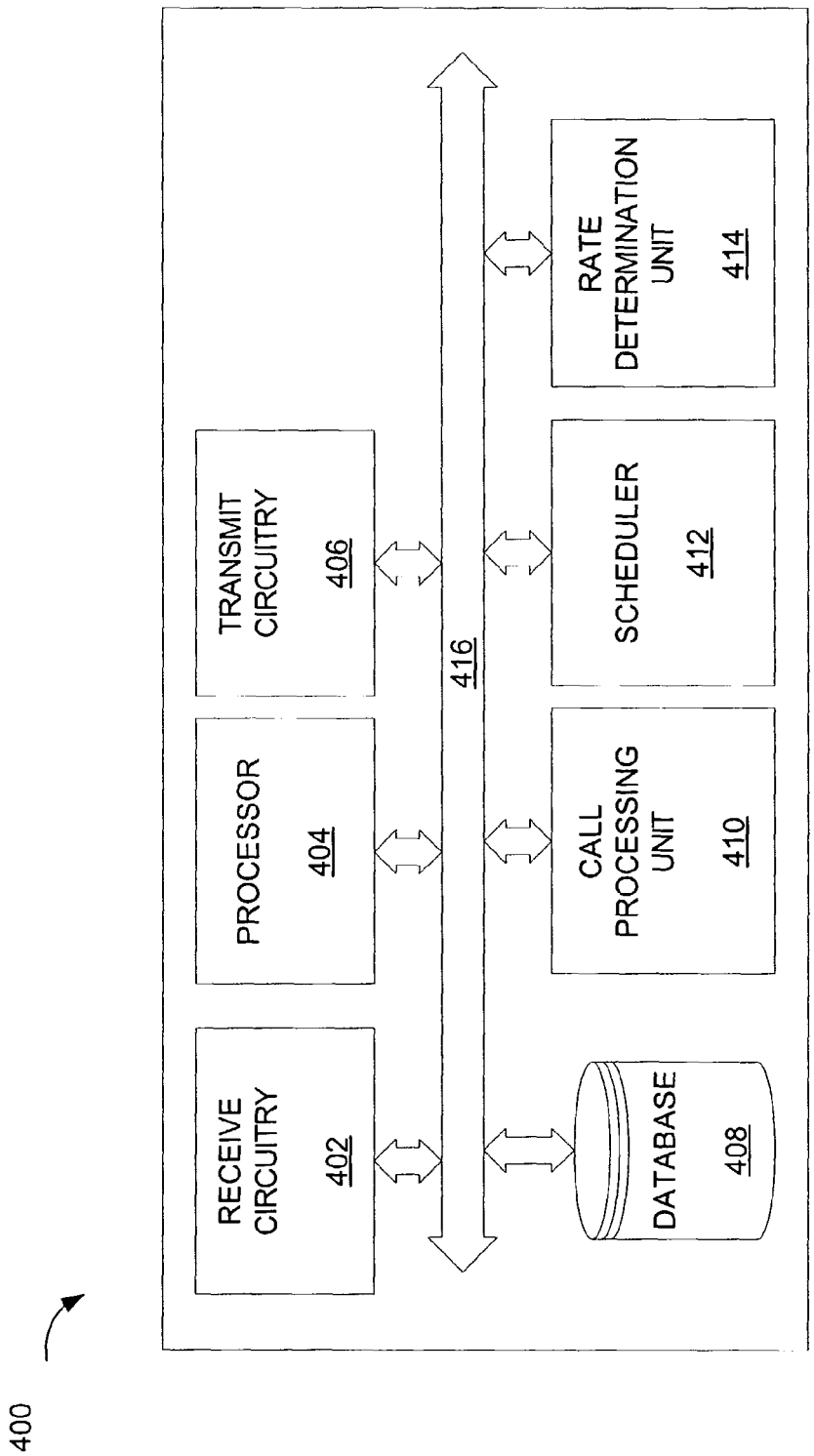
FIG. 6 is a communication control unit.

A controller, such as a base station, according to one embodiment is illustrated in FIG. 6. The unit 400 includes receive circuitry 402, processor 404, transmit circuitry 408, processor 210, scheduler 412, and rate determination unit 414 in communication with the database 408 via a communication bus 416. The rate determination unit 414 and the scheduler 412 use information stored in the database to make decisions for the allocation of system resources. The database may include multiple databases as described hereinabove. Similarly, alternate embodiments may implement a variety of memory structures for recovering the feature information, which is used as a priori input.

Figure 7:
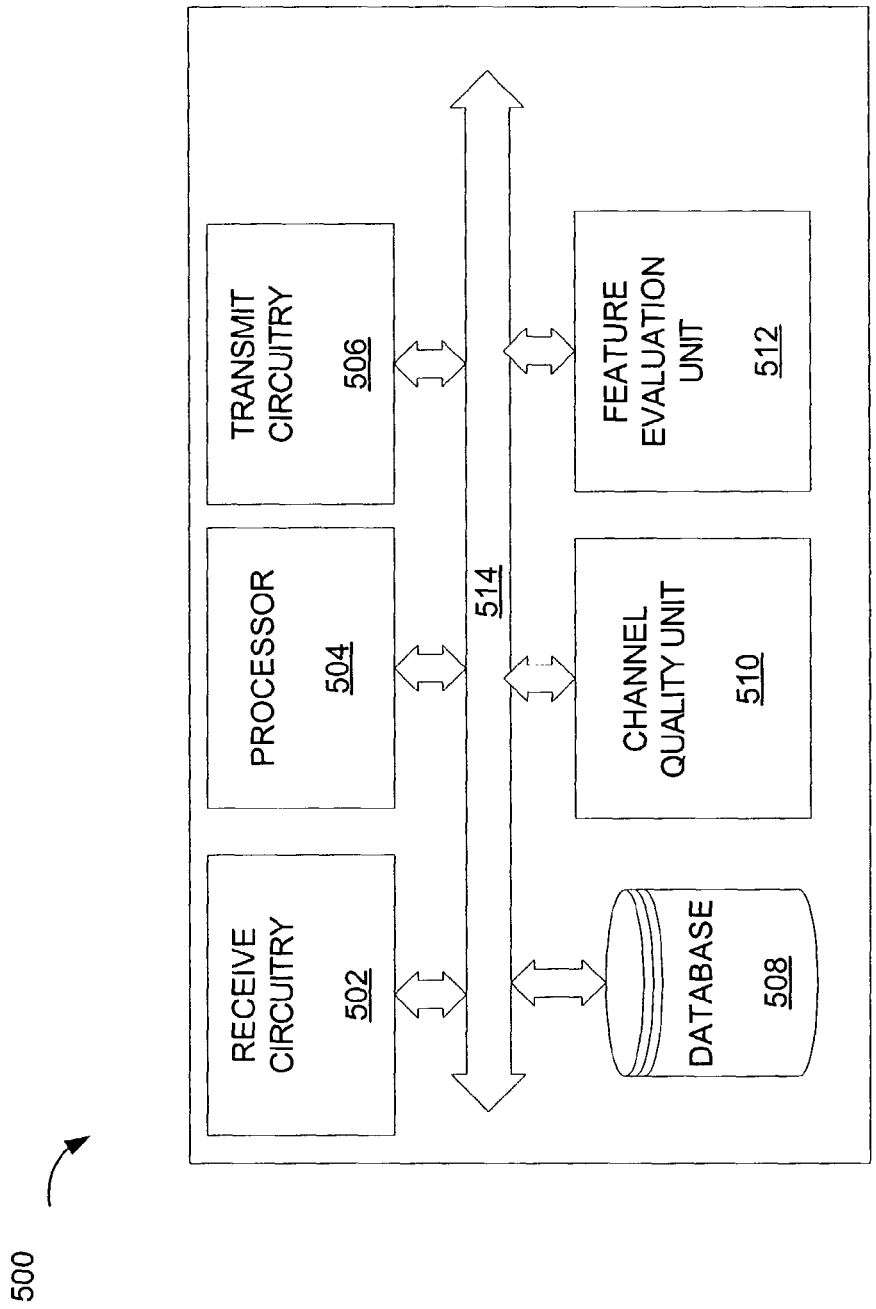
FIG. 7 is a wireless device.

In one embodiment, the feature information is also stored at the wireless device. A device 500 is illustrated in FIG. 7 containing receive circuitry 502, processor 504, transmit circuitry 506, and channel quality unit 510 in communication with a database 508 via a communication bus 514. The channel quality unit 510 provides information to the database 508, which is stored for each user access. Additionally, the device 500 may monitor the channel quality and determine, based on information stored in the database, to prompt the user to initiate an access. For example, consider the case where USER 1 accesses stock quotes via the Internet each morning on route to work at time t1. The channel quality is at a first level during such access. The channel quality unit 510 may access this information stored in database 508 and monitor the channel quality condition. The channel quality unit 510 may then determine that the channel quality improves at time t2. The channel quality unit 510 sends a message to the processor to prompt the user to change access time for this transmission. A feature evaluation unit 512 may be implemented to evaluate the information stored in the database to determine trends. The feature evaluation unit 512 is intended to isolate anomalies and identify changes is patterns of usage. When information is stored in the database, the feature evaluation unit 512 of one embodiment performs statistical analysis to store averages and deviation information of the features. The function of the database is to store the usage information and provide a tool to the device 500 (or in the BS 400) for controlling accesses to the communication system.

Figure 8:
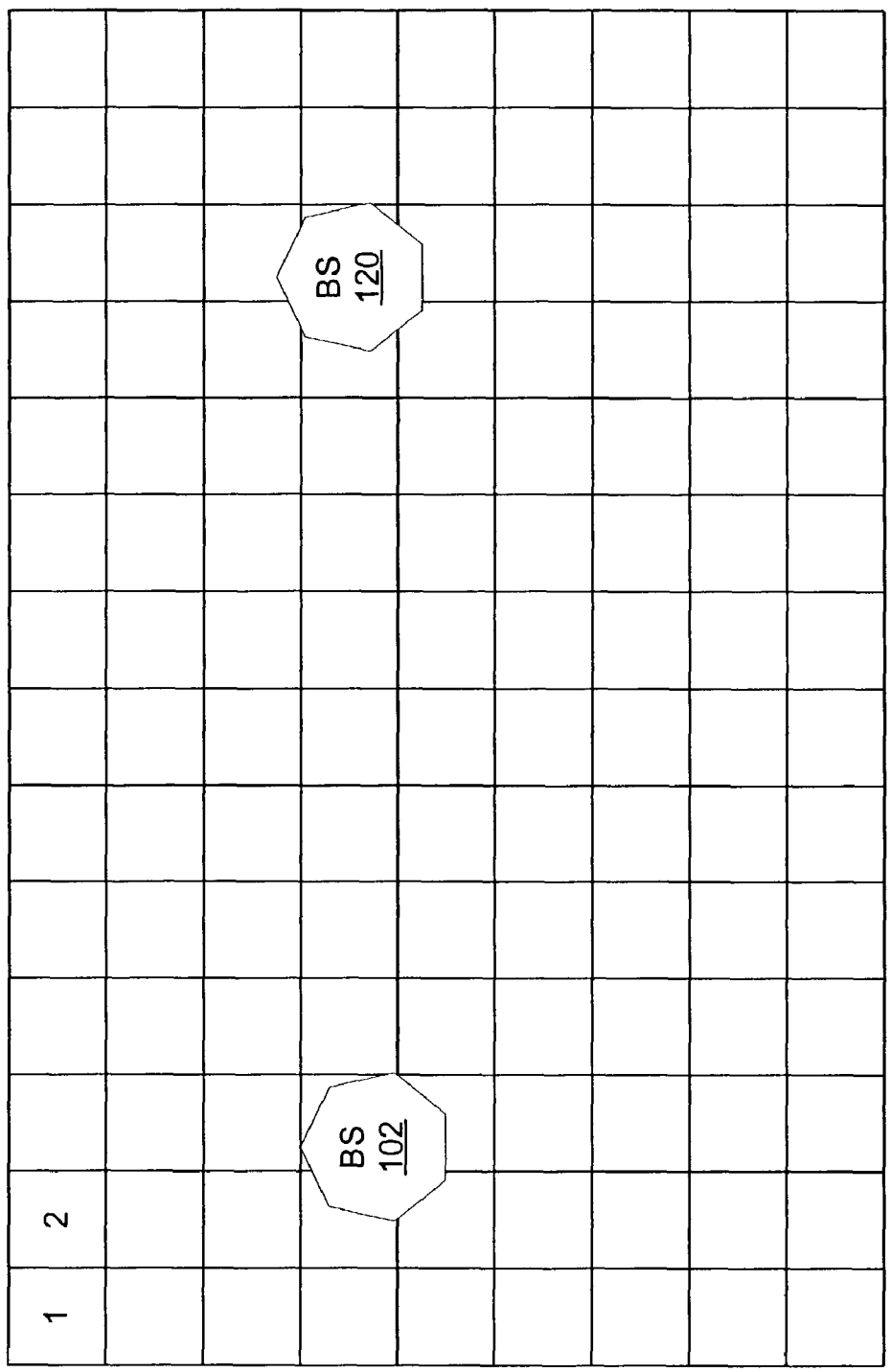
FIG. 8 is an illustration of a communication system topography divided into bins.

As illustrated in FIG. 8, a given coverage area may be divided into bins. Note that the bins are indicated as a grid overlaying a geographical map, however, the bins may be any shape and may be of different sizes. Each bin is then characterized by a set of parameters, including topography, historical channel condition, percentage of time accesses are made from the bin to the network, etc. Each bin is given a bin identifier, as mobile users travel within a system, the bin identifier is used to identify entry into a given bin by a mobile user. The set of parameters associated with the bin are then indexed by the bin identifier and used for scheduling purposes. The size of the bins may be designed to provide coarse or fine adjustment depending on the geographical area and usage patterns. When predicting a given mobile user's travel route based on historical information, information regarding those bins included on the predicted route is accessed in scheduling transmissions to that user. For example, if a user's travel route is through five known bins, the system may retrieve the set of parameters describing each of the five bins by the bin identifiers, and determine which bin(s) will allow the greatest data rate to that user. Transmission to the user is then scheduled to occur during a time range when the user is predicted to enter those bins.

The set of parameters describing the bin could include current information as well as historical information. Parameters may include C/I of the FL and RL, average maximum data rate achievable, average number of users, average loading, availability of other systems, such as an ad-hoc system, etc. The parameters may be calculated as a function of time, wherein the parameters change throughout the day.

In real time, as the system is notified of the current bin location of the user, the system is able to predict future bin(s) and schedule data transmissions accordingly. For example, the system may predict that the user will pass through seven bins on a given time course. At the time of entry into the first and second bins, each supports a first high data rate. In contrast, the third, fourth and fifth have a poor channel condition (due to a building or other structure for example), and can only support a low data rate if any. Continuing on the predicted travel route, the sixth and seventh bins support a second high data rate, different from the first. The system may divide the transmission into two parts. The first part of the transmission is sent while the user is in bins one and two. No transmission is sent while the user is in bins four and five. The transmission is held and not sent until the user is in bins six and seven. The system resources during these intervals could then be used for other users who are enjoying better channel conditions. The channel conditions of the future bins may come form the stored data or from users who are already moving through these bins. In this way, the system dynamically adjusts to a current condition.

Note that according to the exemplary embodiment, the system prepares multiple scenarios for scheduling data transmissions. The first schedule is based on predicted travel routes. Such predictions involve specific travel routes, through specific geographical bins, at specific times. The specific times may be a range of values. The system, however, considers that a user may not always follow the historical travel routes exactly and may vary from time to time. Therefore, the system also determines alternate available routes that the user may take. The system is currently comparing the real time usage patterns of the user to the predictions and updating not only the database storing such information, but also updating the schedules prepared for transmitting data. In a system, such as a High Data Rate (HDR) system, wherein typically only one user receives data at a time, such updating is very beneficial. The system dynamically adjusts to changes in scheduling while allowing smart scheduling based on historical usage patterns.

There are many data services that are not delay sensitive, wherein the service can tolerate long delays and/or the long delays are acceptable to the user. In this case, the system will schedule the transmission so as to optimize system resources and minimize interference. The system will schedule the transmission using the travel route predictions. In this way, the system is able to schedule a portion or all of the data for transmission so as optimize resource management processing. The user may specify a delivery time end point or a maximum delay, or the system may determine such criteria. The user may identify a final destination, whereby the system is able to predict an arrival time and schedule the transmission prior to the arrival time. Within the time period before the arrival time, the system may transmit the information at any time and in any manner supported by the user. For example, the transmission may be in parts, wherein the user is to store each part in memory until receiving all parts of the message or transmission.

Mobility Routes

The user historical information may also be used to predict routes for users within the system. As discussed hereinabove, a system may prepare contingency schedules, so as to dynamically adjust to the current location of a user when such location is different from a predicted one. When a user strays from a predicted travel route, the system may prepare a new prediction from that point, or may wait to see if the current path is minor modification of the predicted one. In the first case, a new set of schedules is prepared adjusting for the new predicted routes. In the latter case, the time of the scheduling may change to accommodate the new modification, however, much of the predicted travel route used in the schedule is maintained. For example, a user may stop for refueling or to purchase supplies, etc., while traveling a predicted route. The minor stop will change the timing of the predicted travel, but not the rest of the travel route.

Channel Prediction

A database, or multiple databases, stored in the base station or the mobile station, such as databases 408, 508, may also store specific information about the various travel routes within a geographical area. The information may be supplied by a Geographical Information System (GIS). The information for a given route or geographical area may then be mapped to user profiles. Information relating to the routes identified may then be used in scheduling transmissions to a given user. The information relating to the routes may include information about route conditions, including traffic conditions. Traffic conditions may consider congestion, probability of congestion-inducing event, such as accidents. Such information may also consider the probability that the condition of the route will change as a function of time of day, such as rush hour, or due to weather conditions. Note that according to one embodiment, scheduling of transmissions considers the weather conditions that may incur delays in a user's travel time. Such time changes impact the travel pattern of a user.

A variety of information may be used for scheduling transmissions. Such information includes that information determined at system design. Additionally, a system may dynamically determine the type of information that is desirable, based on performance of the system. For example, it may be determined, based on performance of the system, that additional information may be beneficial in predicting the channel state of a given route in the geographical area or the channel state associated with a given user's travel route.

The information relating to the routes is then used to predict channel conditions over time. Considering a given user having a travel route for a given time period, the system will predict the channel state along the route for the time period under consideration. The prediction of the channel condition at a specific geographical bin may be accomplished based on stored data or based on data provided by other wireless devices currently passing through these bins. Network planning tools and optimization tools may be used within a base station or remote station to access the route information, as well as other information, and determine a data transmission schedule. Such tools may be used to determine a long-term channel prediction. Interpolation may be used to predict channel states when only minimal information is available. Network planning tools may be implemented with measurement tools in storing and accessing information in the various databases.

Ad-Hoc and Hybrid Networks

A wireless "ad hoc" network is a collection of autonomous nodes or terminals that communicate with each other by forming a multi-hop radio network and by maintaining connectivity in a decentralized manner. Since the nodes communicate over wireless links, they have to contend with the effects of radio communication, such as noise, fading, and interference. In addition, the links typically have less bandwidth than in a wired network. Each node in a wireless ad hoc network functions as both a host and a router, and the control of the network is distributed among the nodes. The network topology is in general dynamic, because the connectivity among the nodes may vary with time due to node departures, new node arrivals, and the possibility of having mobile nodes. Hence, there is a need for efficient routing protocols to allow the nodes to communicate over multi-hop paths consisting of possibly several links in a way that does not use any more of the network "resources" than necessary.

Figure 9:
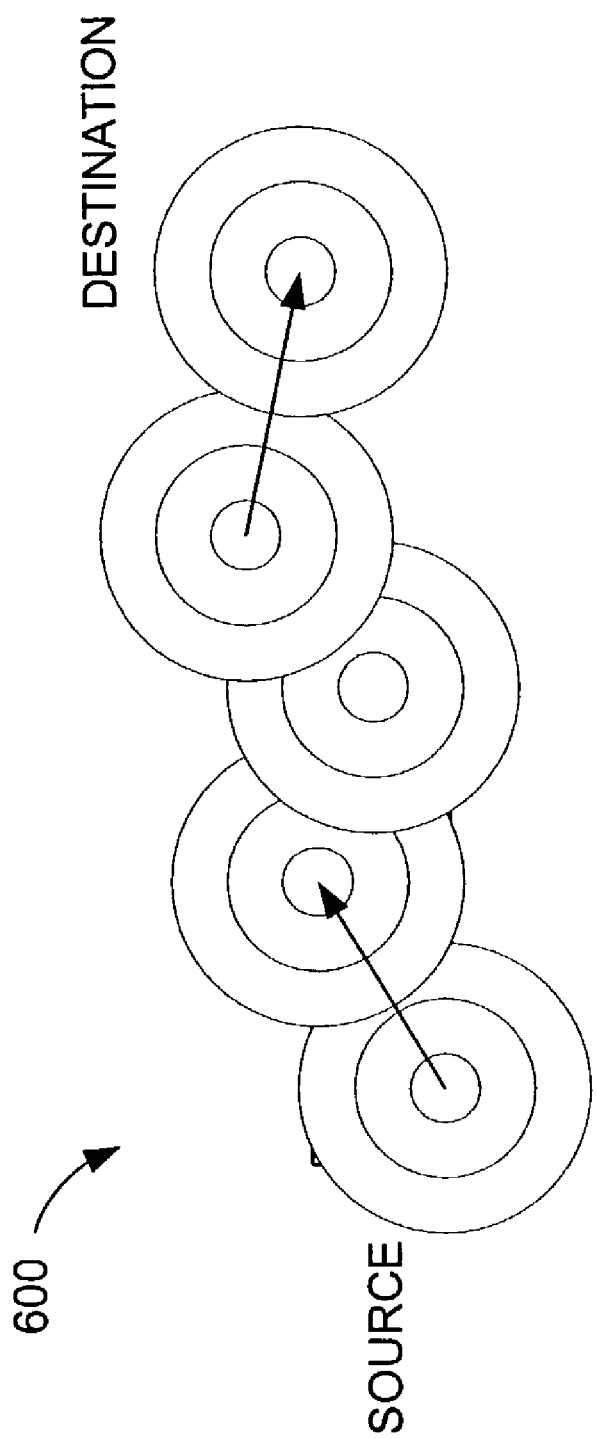
FIG. 9 is an ad hoc network.

The concepts of predicted travel routes are also applicable to an ad-hoc network. As the nodes are mobile, it is desirable to predict where each node will be at a given time with an accepted certainty or probability. As a database is built including information for usage patterns and location of each of the nodes, such information is available for scheduling not only transmissions within an ad-hoc network, but also the structure of the ad-hoc network. An ad-hoc network is illustrated in FIG. 9, wherein the network 600 is defined by multiple hops or connections from a source node through intermediate nodes to a destination node.

Figure 10:
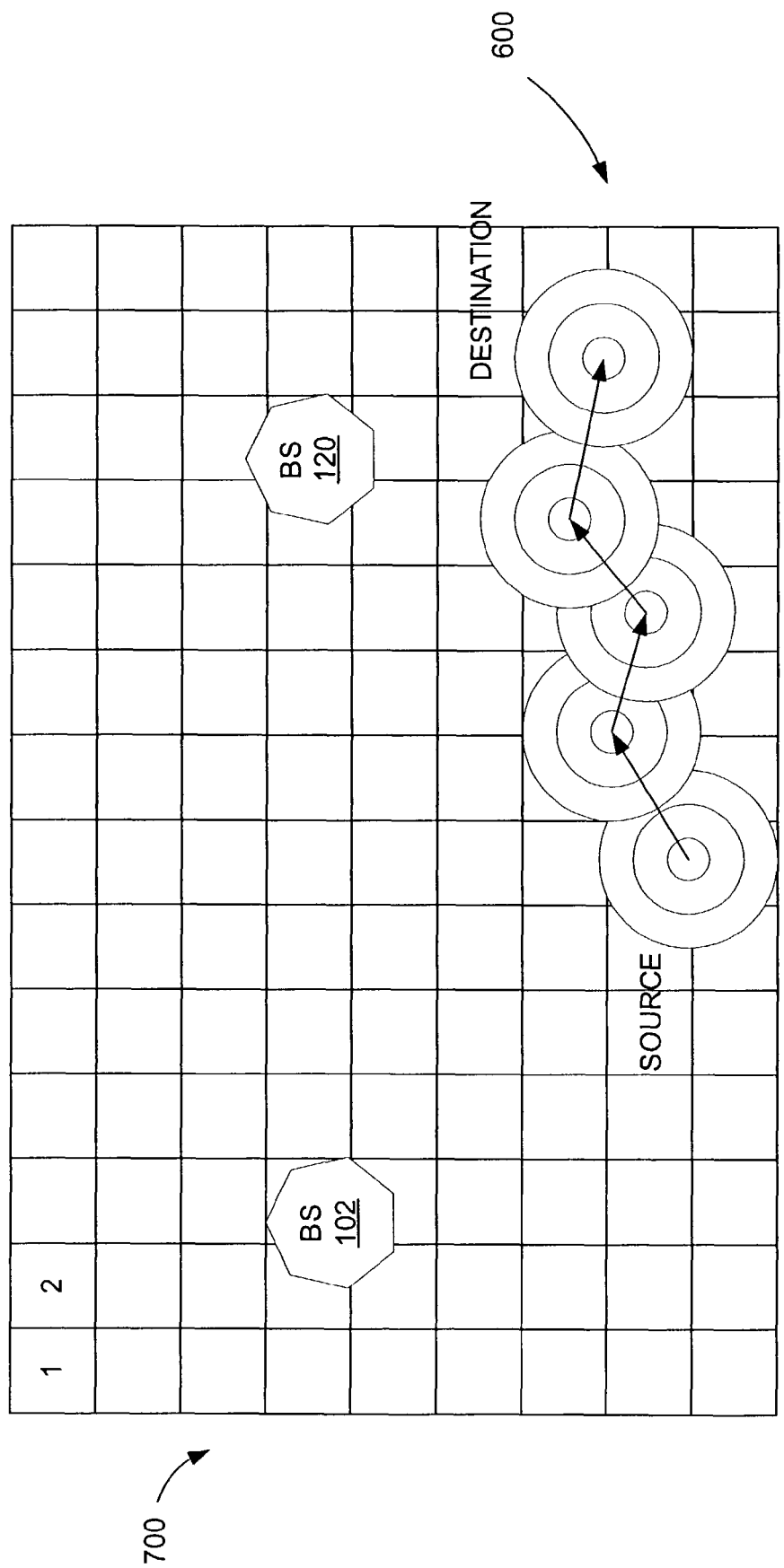
FIG. 10 is an illustration of a communication system topography including an ad hoc network, with the network divided into bins.

Further, as illustrated in FIG. 10, a cellular system 700 (and/or PCS system) may interface with an ad-hoc network 600. As a user (not shown) moves throughout a geographical area, the user may enter into a coverage area that overlaps with the ad-hoc network 600. Transmissions to the user may be scheduled according to the location of the user and/or a prediction of the future location of the user based on historical travel routes. For example, the system may postpone a download to the user until the user enters the ad-hoc network 600.

The geographical area covering the cellular system 700 and ad-hoc network 600 may be divided into bins as described hereinabove. The ad-hoc network 600 may change with time as mobile nodes change location; the bin designations are updated over time to reflect the current position of the ad-hoc network 600.

The ad-hoc network 600 may save location information for each of the individual nodes making up the ad-hoc network 600. Such historical information may be retrieved for use in determining the source-to-destination path of the ad-hoc network 600 at a given time. The ad-hoc network 600 may select a node based on that node's longevity proximate to other nodes. For example, if a first node is to be an intermediary node, but the first node is typically transient, the network may select a second node that is more stationary with respect to the other nodes in the ad-hoc network 600. Similarly, the entire structure of the ad-hoc network 600 making the source-to-destination path may be determined based on historical information of the location and accessibility of individual nodes.

In one embodiment, when a system, such as a cellular, PCS, ad-hoc, hybrid, etc. determines that the user would like to download a file before arrival at a given destination, the system may schedule the download for an optimum time. For example, for a user traveling to a client, the system may schedule the download for arrival at the client. The user may specify by when or by where to receive the download. In these situations, the download may be scheduled for a time when the system anticipates the user will have access to a Wireless Local Area Network (WLAN), such as a "Wi-Fi" network. A Wi-Fi network may be one as designated by the standard entitled "IEEE 802.11 Working Group for Wireless Local Area Networks."

Downloads and Uploads

Downloads may be optimized by the use of historical usage information on a per user basis, wherein downloads may be performed at an optimum time for the system and stored in memory for later access by the user. For example, newly received email messages may be downloaded when the conditions of system loading and mobile user position and channel condition are optimum. The email messages may then be stored in memory at the mobile station and later retrieved by the user. Other data transmissions that are not delay sensitive may be handled similarly. The optimization technique is also applicable to uploading information from the mobile station to the network.

In one embodiment, the user specifies a maximum allowable delay. The user may specify such delay as a final destination. In this case, the system calculates the expected arrival time at the final destination, given the historical information of the user, and then sets the maximum allowable delay accordingly. For example, if a user travels within a specified area each day within a specified time period, but arrives at a known location at a specific time each day, the user may desire to receive all current email messages before reaching the known location, which may be a home office, etc. The system then retrieves the user information and determines at what time the user typically reaches that destination. The delay time is set accordingly. The system may then process emails by transmission to the user within the allowable delay time.

In an alternate embodiment, downloads are scheduled so as to minimize the cost to the user. As the user enters an area of good channel quality, the system anticipates such condition and schedules downloads to transmit while the channel quality is good, and therefore, the data rate is maximized for the user. Transmission at a higher data rate reduces the airtime of the communication and thus may reduce the cost to the user.

Still another embodiment schedules downloads to optimize the system resources. When the demands on the system are low, downloads are scheduled so as to utilize the system resources efficiently.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station apparatus comprising:
   database storing usage features for the apparatus;
   statistical processing unit coupled to the database, configured to schedule resources for a service request based on the stored usage features, wherein the stored usage features include one of type of service requested as a function of time and channel quality as a function of time,
   wherein the configuration to schedule resources is further based on an analysis of the stored usage feature to determine usage patterns and the channel quality corresponding to the usage patterns.

2. The apparatus of claim 1, wherein the stored usage features include location of the apparatus as a function of time.

3. The apparatus of claim 1 further comprising:
   a channel quality unit coupled to the database.

4. A method in a wireless communication system, comprising:
- processing a data service at a remote station over a first time period;
- determining a channel quality for the data service over the first time period;
- storing usage features for the data service over the first time period;
- statistically processing the stored usage features for the data service to determine usage patterns and channel quality corresponding to the determined usage patterns; and
- scheduling a second data service based on at least one of stored usage patterns, the determined usage patterns, and the determined channel quality corresponding to the determined usage patterns.

5. The method as in claim 4, further comprising:
- transmitting the usage patterns to a central controller in the wireless communication system.

6. A remote station apparatus comprising:
a control processor for:
- determining at least one usage feature for a data service of the apparatus, wherein the at least one usage feature includes a channel quality for the data service;
- storing the at least one usage feature for a data service in a database;
- analyzing the stored at least one usage feature to determine usage patterns and the channel quality corresponding to the usage patterns; and
- using the database to aid in resource scheduling according to the usage patterns and the channel quality corresponding to the usage patterns.

7. A method for scheduling transmissions in a wireless communication system, comprising:
- receiving a call initiate request from a remote station;
- storing usage features for at least one data service for the remote station;
- analyzing the stored usage features to determine usage patterns and corresponding channel quality;
- scheduling a transmission based on the usage patterns and the corresponding channel quality; and
- processing the request.

8. A method for scheduling transmissions in a wireless communication system, comprising:
- storing usage features for at least one data service for remote stations in the system;
- analyzing the stored usage features to determine usage patterns and corresponding channel quality; and
- scheduling transmissions according to the usage patterns and the corresponding channel quality.

9. The method as in claim 8, wherein the wireless communication system is an ad-hoc system, the method further comprising:
- determining a source-to-destination path for the ad-hoc network.

10. The method as in claim 8, further comprising:
- receiving a request for a data transmission from a remote station;
- determining a final destination for the remote station; and
- scheduling the data transmission for completion by the final destination.

11. The method as in claim 10, wherein the final destination is identified by a maximum allowable delay.

12. The method as in claim 8, wherein scheduling transmissions comprises:
- determining available resources in the system;
- analyzing the usage patterns; and
- determining data rates for a plurality of remote stations.

13. The method as in claim 8, wherein:
- storing usage features comprises updating any of the stored usage features dynamically as such stored usage features change.

14. The method as in claim 8, wherein:
analyzing the stored usage features to determine usage patterns, comprises:
- receiving current usage information from at least one user; and
- analyzing the current usage information.

15. The method as in claim 14, wherein:
scheduling transmissions according to the usage patterns, comprises:
- scheduling transmissions based on at least one of the stored usage features and the current usage information.

16. An apparatus, comprising:
- means for processing a data service at a remote station in a wireless communication system over a first time period;
- means for determining a channel quality for the data service over the first time period;
- means for storing usage features for the data service over the first time period;
- means for statistically processing the stored usage features to determine usage patterns and channel quality corresponding to the determined usage patterns; and
- means for scheduling a second data service based on at least one of stored usage pattern; the determined usage patterns, and the determined channel quality corresponding to the determined usage patterns.

17. A remote station apparatus, comprising:
memory configured to store a database of usage features for at least one data service used by the apparatus; and
a processing unit configured to:
- determine a channel quality unit; and
- statistically analyze the stored usage features and determine usage patterns and the channel quality unit corresponding to the usage patterns;
- wherein the determinations are used to aid resource scheduling according to the usage patterns and the channel quality unit corresponding to the usage patterns.

18. An apparatus for scheduling transmissions in a wireless communication system, comprising:
- means for receiving a call initiate request from a remote station;
- means for storing usage features for at least one data service for the remote station;
- means for analyzing the stored usage features to determine usage patterns and corresponding channel quality;
- means for scheduling a transmission based on the usage patterns and the corresponding channel quality; and
- means for processing the request.

19. An apparatus for scheduling transmissions in a wireless communication system, comprising:
- means for storing usage features for at least one data service for remote stations in the system;
- means for analyzing the stored usage features to determine usage patterns and corresponding channel quality; and
- means for scheduling transmissions according to the usage patterns and the corresponding channel quality.

20. The apparatus as in claim 19, wherein the stored usage features are stored according to geographical bins.

21. An apparatus for scheduling transmissions in a wireless communication system, comprising:
- means for storing usage features for at least one data service for remote stations in the system;

means for analyzing the stored usage features to determine usage patterns;

means for scheduling transmissions according to the stored usage patterns; and means for predicting channel condition for at least one geographical bin, wherein the stored usage features are stored according to geographical bins, and wherein the means for scheduling transmissions comprises means for scheduling transmissions according to usage patterns and channel condition prediction.

22. The apparatus as in claim 21, wherein the means for analyzing comprises means for predicting channel condition is based on data provided by wireless devices passing through the at least one geographical bin.

23. A remote station apparatus comprising:

database storing usage features for the apparatus;

statistical processing unit coupled to the database, configured to schedule resources for a service request based on the stored usage features, wherein the stored usage features include one of type of service requested as a function of time and channel quality as a function of time, wherein a usage pattern and a channel quality corresponding to the usage pattern are generated based on an analysis of the stored usage feature, and the configuration to schedule resources is further based on the generated usage pattern and the channel quality corresponding to the usage pattern.

* * * * *